US012593389B2

(12) United States Patent
Tolle et al.

(10) Patent No.: US 12,593,389 B2
(45) Date of Patent: Mar. 31, 2026

(54) METHOD OF MERGING TWO LIGHTING SYSTEMS

(71) Applicant: SIGNIFY HOLDING B.V., Eindhoven (NL)

(72) Inventors: Tobias Georg Tolle, Beerse (BE); Hugo José Krajnc, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 42 days.

(21) Appl. No.: 18/555,349

(22) PCT Filed: Apr. 11, 2022

(86) PCT No.: PCT/EP2022/059605
§ 371 (c)(1),
(2) Date: Oct. 13, 2023

(87) PCT Pub. No.: WO2022/218910
PCT Pub. Date: Oct. 20, 2022

(65) Prior Publication Data
US 2024/0188205 A1 Jun. 6, 2024

(30) Foreign Application Priority Data
Apr. 16, 2021 (EP) .................................... 21168908

(51) Int. Cl.
*H05B 47/175* (2020.01)
*H05B 47/11* (2020.01)

(52) U.S. Cl.
CPC ........... *H05B 47/198* (2024.01); *H05B 47/11* (2020.01)

(58) Field of Classification Search
CPC .... H05B 47/105; H05B 47/11; H05B 47/198; H05B 47/199; Y02B 20/40
See application file for complete search history.

(56) References Cited

U.S. PATENT DOCUMENTS

| | | | | |
|---|---|---|---|---|
| 8,981,913 | B2 * | 3/2015 | Henig ................ | H05B 47/1995 340/12.5 |
| 12,147,731 | B2 * | 11/2024 | Kusano .............. | H04N 21/8113 |
| 2011/0199004 | A1 | 8/2011 | Henig et al. | |
| 2012/0082062 | A1 | 4/2012 | McCormack | |
| 2014/0354161 | A1 * | 12/2014 | Aggarwal ............ | H05B 47/105 315/153 |

(Continued)

FOREIGN PATENT DOCUMENTS

WO 2018158185 A1 9/2018

*Primary Examiner* — Raymond R Chai

(57) ABSTRACT

A method of merging a first lighting system with a second lighting system is disclosed. The first lighting system can have a plurality of first lighting devices located in a space and a first lighting control system, and the second lighting system can have a plurality of second lighting devices located in the space and a second lighting control system. The method can obtain signals that indicate a location of a second lighting device relative to a first lighting device, determine if the second lighting device is located within a predetermined proximity range of the first lighting device, obtain information indicating an association between the first lighting device and an area in the space, associate the second lighting device with the area, store the association in a memory of the first lighting control system, and connect the second lighting device to the first lighting control system.

14 Claims, 5 Drawing Sheets

100

(56) References Cited

U.S. PATENT DOCUMENTS

| | | | | |
|---|---|---|---|---|
| 2015/0250042 | A1* | 9/2015 | Aggarwal | H05B 47/18 315/312 |
| 2019/0014172 | A1 | 1/2019 | Chaki et al. | |
| 2020/0167846 | A1 | 5/2020 | Aliakseyeu et al. | |
| 2022/0377868 | A1 | 11/2022 | Krajnc | |
| 2022/0377869 | A1 | 11/2022 | Rozendaal et al. | |
| 2024/0395517 | A1* | 11/2024 | Yamazawa | H01J 37/32935 |
| 2024/0430663 | A1* | 12/2024 | Morsey | H04L 67/535 |

* cited by examiner

METHOD OF MERGING TWO LIGHTING SYSTEMS

CROSS-REFERENCE TO PRIOR APPLICATIONS

This application is the U.S. National Phase application under 35 U.S.C. §371 of International Application No. PCT/EP2022/059605, filed on Apr. 11, 2022, which claims the benefit of European patent application Ser. No. 21/168,908.8, filed on Apr. 16, 2021. These applications are hereby incorporated by reference herein.

FIELD OF THE INVENTION

The invention relates to a method of merging a first lighting system with a second lighting system, and to a computer program product for executing the method. The invention further relates to a control system for merging a first lighting system with a second lighting system.

BACKGROUND

Home lighting systems enable users to configure and control lighting devices via a wireless network. Typically, users have a single lighting system installed. It may, however, occur that multiple lighting systems have been installed. These lighting systems may for example have been manufactured by different manufacturers. A first lighting system may be controllable and/or configurable via a first software application, and a second lighting system may be controllable and/or configurable via a second software application. Operating/configuring two of those systems may be quite cumbersome, because it requires that a user switches between these software applications. Hence, it may be desirable to merge both lighting systems into a single lighting system.

If a user would want to add lighting devices of a first lighting system to another lighting system, the user has to manually add the lighting devices of the first lighting system to the other lighting system, for instance via a software application of the other lighting system. This can be a rather cumbersome process.

US 20140354161 A1 discloses networked intelligent lighting devices and other elements connected to the network of a lighting system readily adaptable to desirable networking arrangements as well as logical functional groups, for example by each storing communication provisioning data and/or configuration data for logically associating system elements into one or more groupings or subnetworks.

SUMMARY OF THE INVENTION

It is an object of the present invention to provide a system and a method for automatically merging multiple lighting systems.

According to a first aspect of the present invention, the object is achieved by a method of merging a first lighting system with a second lighting system, wherein the first lighting system comprises a plurality of first lighting devices located in a space and a first lighting control system for controlling the plurality of first lighting devices, wherein the second lighting system comprises a plurality of second lighting devices located in the space and a second lighting control system for controlling the plurality of second lighting devices, wherein the method comprises:

obtaining one or more signals, which one or more signals are indicative of a location of a second lighting device of the plurality of second lighting devices relative to a first lighting device of the plurality of first lighting devices, determining if the second lighting device is located within a predetermined proximity range of the first lighting device based on the one or more signals, obtaining, from the first lighting control system, information indicative of an association between the first lighting device and an area in the space, associating, if the second lighting device is located within the predetermined proximity range, the second lighting device with the area associated with the first lighting device, storing the association in a memory of the first lighting control system, and connecting the second lighting device to the first lighting control system.

The first and the second lighting system are located in the same space. Each first lighting device of the first lighting system may be located in a respective area of the space. The one or more signals are obtained, which are indicative of the location of a second lighting device relative to a first lighting device. Then, it is determined whether the second lighting device is located within a predetermined proximity range of the first lighting device. If so, the second lighting device is associated with an area with which the first lighting device is associated. If not, the second lighting device may not be associated with that area (but for instance with another area, or with no area at all). This association is then stored in a memory of the first lighting system, thereby providing a method for automatically merging multiple lighting systems. This is beneficial, because it enables associating second lighting devices of the second lighting system with areas in which one or more first lighting devices of the first lighting system are located. This also reduces the manual input required for merging multiple lighting systems. During this process, the second lighting device is connected to the first lighting system such that the second lighting device is controllable by the first lighting system. This step of connecting the second lighting device to the first lighting system may be performed before or after any step of the method.

The method may further comprise: obtaining, from the first lighting control system, one or more lighting control rules associated with the first lighting device, associating the second lighting device with the one or more lighting control rules, and storing the association in the memory. The one or more lighting control rules are control rules for controlling the first lighting device. These rules may, for example, be time-based lighting control routines, sensor-based lighting control rules, user input-based lighting control rules, etc. The one or more lighting control rules may be control rules for controlling lighting devices in the area. By associating the one or more lighting control rules with the second lighting device (which rules are also associated with the first lighting device), the second lighting device is controlled in a similar way as the first lighting device and the second lighting device behaves the same as a lighting device located in the same area. This further reduces the manual input required for merging and configuring multiple lighting systems.

The one or more signals may be signals communicated between the first lighting device and the second lighting device. The method may comprise: determining that the second lighting device is located within the predetermined proximity range based on signal characteristics of the signals communicated between the first lighting device and the second lighting device. The signals may, for example, be radio signals, audio signals, light, etc. A distance between the first lighting device and the second lighting device may be determined based on the signal characteristics (e.g. based on an RSSI of the signal, based on the Time of Flight of a signal, the intensity of the signal, etc.). The predetermined proximity range may for example be a threshold distance, and if the distance between the first lighting device and the second lighting device does not exceed the threshold distance, it may be determined that the second lighting device is located within the predetermined proximity range.

The one or more signals may comprise one or more first control signals indicative of control of the first lighting device and one or more second control signals indicative of control of the second lighting device, and the method may comprise: determining a presence of a temporal correlation between the control of the first lighting device and the control of the second lighting device, and determining that the second lighting device is located within the predetermined proximity range of the first lighting device if the temporal correlation is present. In other words, when the first device and the second device are controlled at substantially the same time, it may be determined that the second lighting device is located within the predetermined proximity range of the first lighting device.

The one or more signals may comprise a first user-defined name of the first lighting device and a second user-defined name of the second lighting device, and the method may comprise: comparing the first user-defined name to the second user-defined name, and determining that the second lighting device is located within the predetermined proximity range of the first lighting device if the first user-defined name is similar to the second user-defined name. The first and second user-defined names may be compared to determine similarities, and if the first user-defined name is sufficiently similar to the second user-defined name, it may be determined that the first lighting device and the second lighting device are located in the same area.

The one or more signals may comprise a first user-defined name descriptive of the area and a second user-defined name of the second lighting device, and the method may comprise: comparing the first user-defined name to the second user-defined name, and determining that the second lighting device is located within the predetermined proximity of the first lighting device if the first user-defined name is similar to the second user-defined name. If the user-defined name of the second lighting device corresponds to the name of the area, it may be determined that the first lighting device and the second lighting device are located in the same area.

The first lighting device may comprise a first sensor and the second lighting device may comprise a second sensor. The one or more signals may comprise first sensor data from the first sensor and second sensor data from the second sensor. The method may comprise: comparing the first sensor data to the second sensor data, and determining that the second lighting device is located within the predetermined proximity range of the first lighting device if the first sensor data is similar to the second sensor data. The first sensor and the second sensor may be sensors for detecting environmental parameters (e.g. light levels, temperature levels, noise/sound, humidity, user presence, etc.). If the first sensor data corresponds to (is sufficiently similar to) the second sensor data, it may be determined if the second lighting device is located within the predetermined proximity range of the first lighting device. The method may further comprise: determining a presence of a temporal correlation between the first sensor data and the second sensor data, and determining that the second lighting device is located within the predetermined proximity range of the first lighting device if the temporal correlation is present. In other words, when sensor values of the first and second sensors change at the same time, it may be determined that the second lighting device is located within the predetermined proximity range of the first lighting device.

The first lighting device may comprise a light sensor and the one or more signals may comprise a sensor signal from the light sensor indicative of a change of the light level in the space and a control signal indicative of control of the second lighting device. The method may comprise: determining a presence of a temporal correlation between the control of the second lighting device and the sensor signal, and determining that the second lighting device is located within the predetermined proximity range of the first lighting device if the temporal correlation is present. Additionally or alternatively, the second lighting device may comprise a light sensor and wherein the one or more signals comprise a sensor signal from the light sensor indicative of a change of the light level in the space and a control signal indicative of control of the first lighting device. The method may further comprise: determining a presence of a temporal correlation between the control of the first lighting device and the sensor signal, and determining that the second lighting device is located within the predetermined proximity range of the first lighting device if the temporal correlation is present. In other words, at least one of the lighting devices may comprise a light sensor, and when a change in light in the environment corresponds to a change of the light output of the other lighting device, it may be determined that the lighting devices are within the predetermined proximity range.

The method may further comprise: requesting a user to confirm if the second lighting device is located in the area, and executing associating the second lighting device with the area only if the confirmation is positive. This is beneficial, because the user simply has to confirm (or unconfirm) if the second lighting device is located in the area of the first lighting device, thereby reducing the chance of erroneous associations.

The method may further comprise: rendering, on a display, virtual representations of the area, the first lighting device and the second lighting device. The virtual representations may be rendered to indicate that the first lighting device and the second lighting device have been associated with the same area.

The method may further comprise: controlling the second lighting device by changing its light output after the second lighting device has been associated with the area. This is beneficial because the user is notified that the second lighting device has been associated with the area. Additionally or alternatively, the method may comprise: controlling the first lighting device by changing its light output after the second lighting device has been associated with the area. This is beneficial because the user is notified that the first and second lighting device both have been associated with the (same) area.

The method may further comprise: obtaining one or more further signals, which one or more further signals are indicative of a location of a further second lighting device of the plurality of second lighting devices relative to a further first lighting device of the plurality of first lighting devices, determining that the further second lighting device is located within a predetermined proximity range of the further first lighting device based on the one or more further signals, obtaining, from the first lighting control system, information indicative of an association between the further first lighting device and a further area in the space, associating, if the further second lighting device is located within the predetermined proximity range, the further second lighting device with the further area associated with the further first lighting device, storing the association in a memory of the first lighting control system, and connecting the further second lighting device to the first lighting control system. The steps of the method may thus be performed for multiple second lighting devices of the second lighting system, to associate each lighting device with its respective area.

According to a second aspect of the present invention, the object is achieved by a computer program product for a computing device, the computer program product comprising computer program code to perform the method of any preceding claim when the computer program product is run on a processing unit of the computing device. According to a third aspect of the present invention, the object is achieved by a control system for merging a first lighting system with a second lighting system, wherein the first lighting system comprises a plurality of first lighting devices located in a space and a first lighting control system for controlling the plurality of first lighting devices, wherein the second lighting system comprises a plurality of second lighting devices located in the space and a second lighting control system for controlling the plurality of second lighting devices, wherein the control system comprises:

- an input configured to obtain one or more signals, which one or more signals are indicative of a location of a second lighting device of the plurality of second lighting devices relative to a first lighting device of the plurality of first lighting devices,
- a processor configured to determine if the second lighting device is located within a predetermined proximity range of the first lighting device based on the one or more signals, obtain, from the first lighting control system, information indicative of an association between the first lighting device and an area in the space, associate, if the second lighting device is located within the predetermined proximity range, the second lighting device with the area associated with the first lighting device, store the association in a memory of the first lighting control system, and connect the second lighting device to the first lighting control system.

It should be understood that the computer program product and the control system may have similar and/or identical embodiments and advantages as the above-mentioned methods.

BRIEF DESCRIPTION OF THE DRAWINGS

The above, as well as additional objects, features and advantages of the disclosed systems, devices and methods will be better understood through the following illustrative and non-limiting detailed description of embodiments of devices and methods, with reference to the appended drawings, in which.

All the figures are schematic, not necessarily to scale, and generally only show parts which are necessary in order to elucidate the invention, wherein other parts may be omitted or merely suggested.

DETAILED DESCRIPTION

Figure 1:
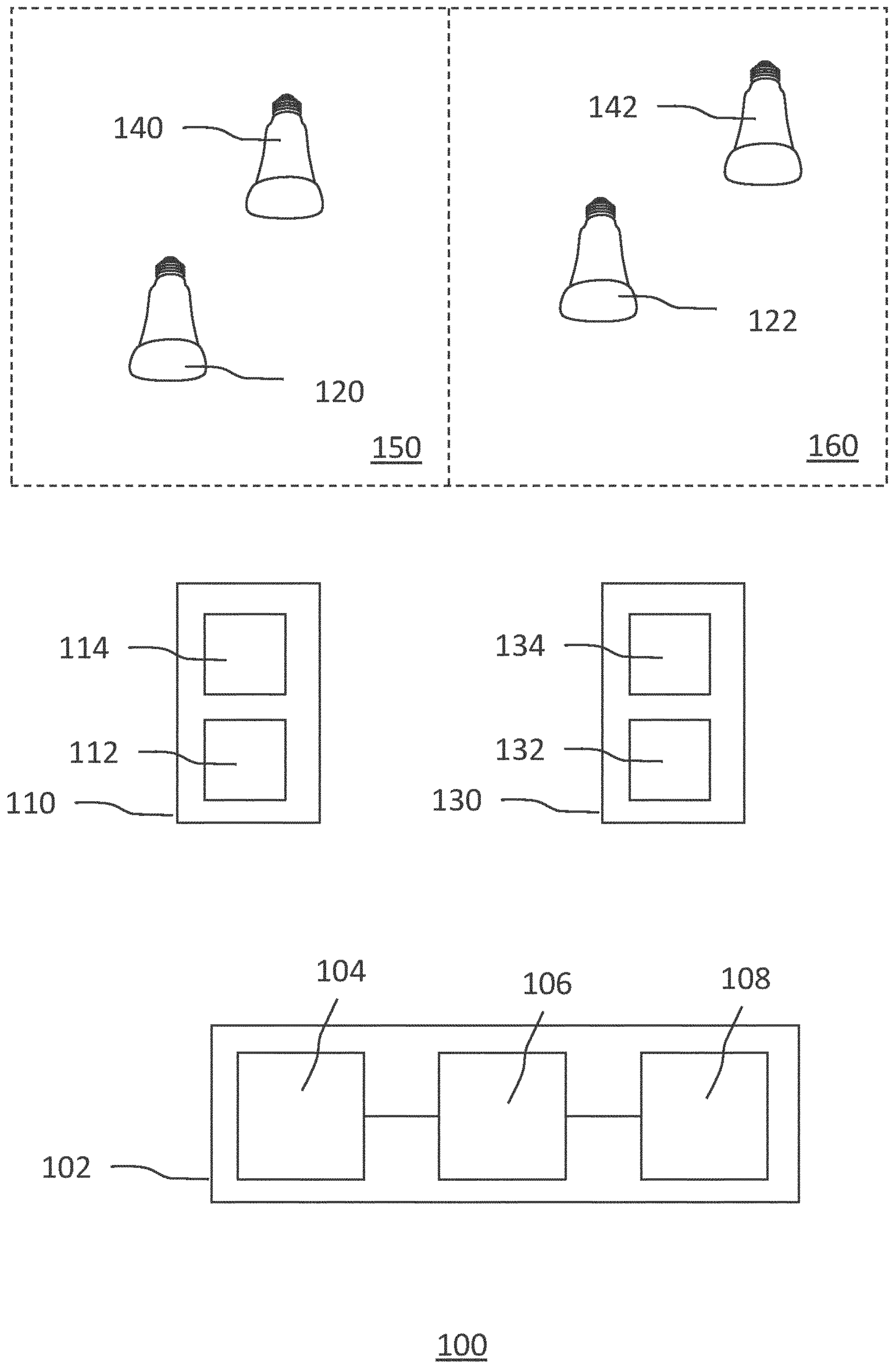
FIG. 1 shows schematically an example of a system comprising a control system, a first lighting system and a second lighting system.

FIG. 1 shows a system 100 comprising a control system 102 for merging a first lighting system with a second lighting system. The first lighting system comprises a plurality of first lighting devices 120, 122 and a first lighting control system 110 for controlling the plurality of first lighting devices 120, 122. The second lighting system comprises a plurality of second lighting devices 140, 142 and a second lighting control system 130 for controlling the plurality of second lighting devices 140, 142. The control system 102 comprises an input 104 configured to obtain one or more signals, which one or more signals are indicative of a location of a second lighting device of the plurality of second lighting devices 140, 142 relative to a first lighting device of the plurality of first lighting devices 120, 122. The control system 102 comprises a processor 106 configured to determine if the second lighting device is located within a predetermined proximity range of the first lighting device based on the one or more signals, to obtain, from the first lighting control system 110, information indicative of an association between the first lighting device and an area in the space, to associate, if the second lighting device is located within the predetermined proximity range, the second lighting device with the area associated with the first lighting device, to store the association in a memory 112 of the first lighting control system 110, and to connect the second lighting device to the first lighting control system 110 such that the second lighting device can be controlled by the first lighting control system 110.

The first and second lighting systems may be lighting systems of different manufacturers or of the same manufacturer. The first and second lighting systems comprise respective lighting control systems 110, 130 for controlling the first lighting devices 120, 122 and the second lighting devices 140, 142, respectively. The lighting control systems 110, 130 may each be comprised in a lighting control device, such as a bridge, a hub, a smartphone, a (remote) server, etc. The first lighting control system 110 may comprise a communication unit 114 configured to communicate lighting control commands to the first lighting devices 120, 122. Similarly, the second lighting control system 130 may comprise a communication unit 134 configured to communicate lighting control commands to the second lighting devices 140, 142. The communication units 114, 134 may be configured to communicate with the respective lighting devices via one or more (wireless) communication protocols, such as Zigbee, Bluetooth, Wi-fi, Thread, Z-Wave, etc., and/or via the internet when for example the respective lighting control system is comprised in a remote server. The lighting devices 120, 122, 140, 142 may comprise receivers for receiving the control commands from the respective communication units 114, 134. The lighting devices 120, 122, 140, 142 each comprise a processing unit for processing control commands to control one or more (LED) light sources of the respective lighting device.

The control system 102 may be comprised in any type of device configured to configure a lighting system. Depending on the system architecture of the system 100, the control system 102 may, for example, be comprised in a smartphone, in a bridge, in a remote server, or for example in the first lighting control system. Depending on the system architecture of the system 100, the processor 102 may comprise a communication unit 108 configured to communicate with the first and/or second lighting control system 110, 130. For instance, when the control system 102 is comprised in a device separate from the first and/or second lighting control system 110, 130, the control system 102 may comprise a communication unit 108. The communication unit 108 may be configured to communicate with the communication units 114, 134 of the lighting control systems 110, 130, via one or more (wireless) communication protocols. It should be understood that these are mere examples and that the skilled person is able to conceive alternative system architectures without departing from the scope of the appended claims.

In the example of FIG. 1, a primary first lighting device 120 of the plurality of first lighting devices 120, 122 of the first lighting system is located in a first area 150 of the space, a further first lighting device 122 of the plurality of first lighting devices 120, 122 of the first lighting system is located in a second area 160 of the space, a second lighting device 140 of the plurality of second lighting devices 140, 142 of the second lighting system is located in the first area 150 of the space and a further second lighting device 142 of the plurality of second lighting devices 140, 142 of the second lighting system is located in the second area 160 of the space. The space may, for example, be a building, and the areas 150, 160 may, for example, be separate rooms. In another example, the areas 150, 160 may be different parts of a room.

The control system 102 comprises an input 104 configured to obtain one or more signals, which one or more signals are indicative of a location of a second lighting device of the plurality of second lighting devices 140, 142 relative to a first lighting device of the plurality of first lighting devices 120, 122. The input 104 may be configured to obtain the one or more signals from, for example, a memory storing the signals, from the first or second lighting system controller 110, 130, from a positioning system, from one or more sensors, etc. Different types of signals may be indicative of the location of the second lighting device relative to the first device. Examples of such signals are described below.

The control system 102 comprises a processor 106 (e.g. circuitry, a microcontroller, etc.) configured to determine if the second lighting device is located within a predetermined proximity range of the first lighting device based on the one or more signals. In the example of FIG. 1, the processor 106 may determine that second lighting device 140 is located within a predetermined proximity range of first lighting device 120 based on the one or more signals.

The processor 106 is further configured to obtain, from the first lighting control system 110, information indicative of an association between the first lighting device and an area in the space. This information may, for example, be stored in a memory 112 of the first lighting control system 110. The memory 112 may store information indicative of associations of the first lighting devices 120, 122 of the first lighting system and areas 150, 160 of the space, for instance in a look-up table. In the example of FIG. 1, the processor 106 may obtain information indicative of an association between first lighting device 120 and area 150) in the space (and information indicative of an association between a further first lighting device 122 and area 160 in the space).

The processor 106 is further configured to associate, if the second lighting device is located within the predetermined proximity range, the second lighting device with the area associated with the first lighting device, and to store the association in the memory 112 of the first lighting control system 110. In the example of FIG. 1, the processor 106 may, after determining that second lighting device 140 is located within the predetermined proximity range of first lighting device 120, associate second lighting device 140 with area 150, and store the association in memory 112 of the first lighting control system 110 by communicating data indicative of the association to the first lighting control system 110. The first lighting control system 110 may then update its memory, for instance by updating a look-up table, and add the second lighting device 140 to area 150. After successful association of the second lighting device 140, the second lighting device 140 has been merged with the first lighting system, whereupon the first lighting control system 110 may control the second lighting device 140. Similarly, the processor 106 may, after determining that the further second lighting device 142 is located within the predetermined proximity range of the further first lighting device 122, associate further second lighting device 142 with area 160, and store the association in memory 112 of the first lighting control system 110 by communicating data indicative of the association to the first lighting control system 110.

The processor 106 is further configured to automatically connect the second lighting device 140 (and the further second lighting device 142) to the first lighting control system 110. This may be performed by providing an identifier, configuration data, network credentials, etc. of the second lighting device to the first lighting control system 110. The second lighting system controller 130 may provide data for connecting the second lighting device to the processor 106, the processor 106 may obtain data for connecting the second lighting device to the first lighting control system 110 from the second lighting device, etc. Techniques for adding lighting devices to a lighting control system are known in the art and will therefore not be discussed in detail.

The processor 106 may be further configured to communicate data to the second lighting control system 130 to inform the second lighting control system 130 that the second lighting device has been added to the first lighting control system 110. The processor 106 may, for example, instruct the second lighting control system 130 to remove the second lighting device from the second lighting control system 110 and/or to remove an association between the second lighting device and an area from the memory 132 of the second lighting control system 130.

The processor 106 may be configured to obtain, from the first lighting control system 110, one or more lighting control rules associated with the first lighting device. The one or more control rules may be control rules for controlling lighting devices in the area. The control rules may, for example, be lighting control routines (e.g. scheduled light settings), be sensor-based lighting control rules (e.g. lighting control rules that trigger when a sensor detects a value/event), be user input-based lighting control rules (e.g. a user-defined light setting that is activated when a sensor/switch is triggered), etc. The processor 106 may be further configured to associate the second lighting device with the one or more lighting control rules and store the association in the memory 114 of the first lighting control system 110, such that the first lighting control system 110 is configured to control the second lighting device according to the one or more lighting control rules.

Figure 3:
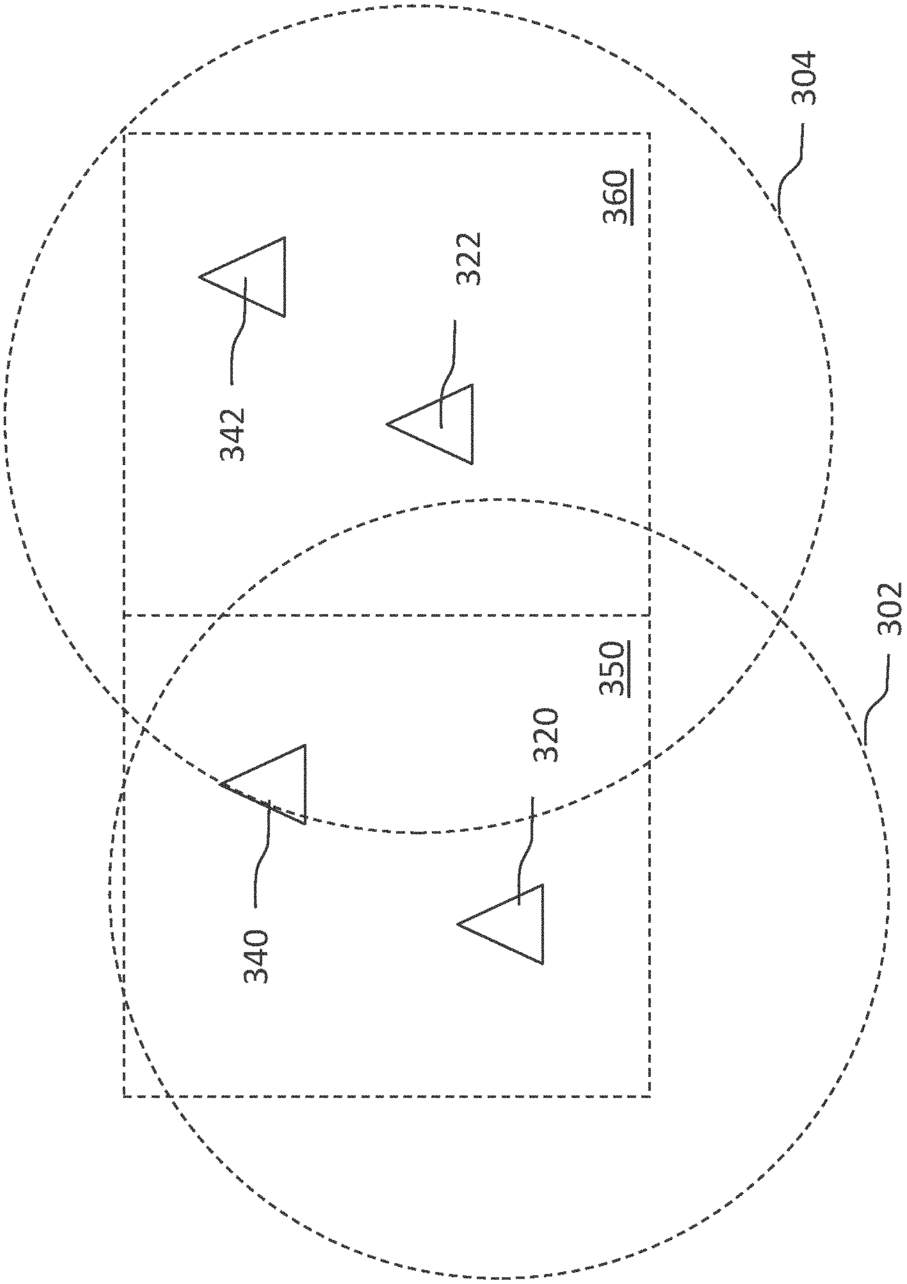
FIG. 3 shows schematically an example of predetermined proximity ranges of a lighting device of a lighting system.

The processor 106 is configured to determine if the second lighting device is located within a predetermined proximity range of the first lighting device based on the one or more signals. FIG. 3 shows examples of predetermined proximity ranges 302, 304 of respective lighting devices 320, 322. The predetermined proximity range may be defined in various ways, which are described in the following examples.

Figure 2:
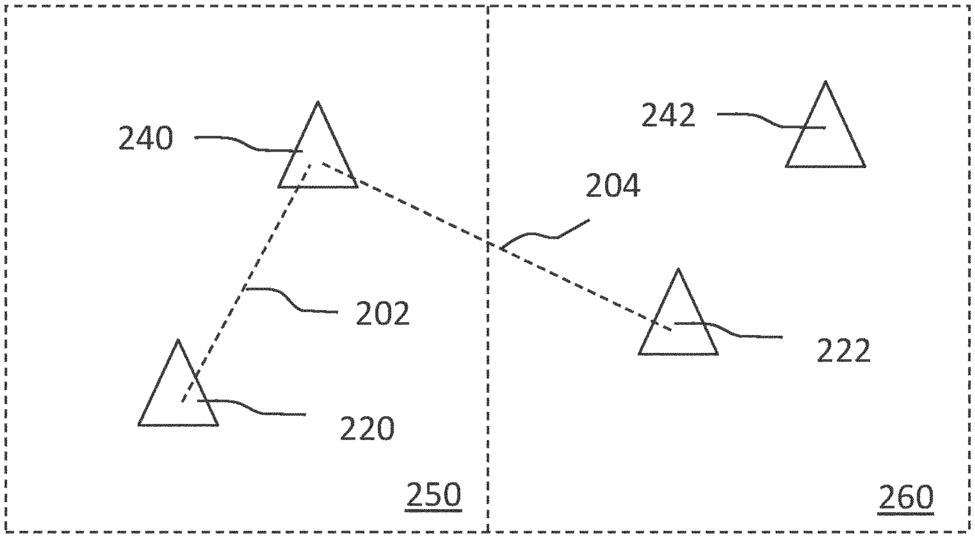
FIG. 2 shows schematically an example of distances between a lighting device of a second lighting system relative to lighting devices of a first lighting system.

The one or more signals may be signals communicated between the first lighting device and the second lighting device. The processor 106 may be configured to determine if the second lighting device is located within the predetermined proximity range based on signal characteristics of the signals communicated between the first lighting device and the second lighting device. The signals may, for example, be radio frequency (RF) signals, ultrasound/audio signals, light signals (e.g. Visible Light Communication/Li-Fi), etc. The processor 106 may be configured to determine a distance between the first lighting device and the second lighting device based on the signal characteristics. The processor 106 may, for example, be configured to determine the distance between the first and second lighting device based on a received signal strength indicator (RSSI) of the communicated signal, based on a signal-to-noise (SnR) ratio, based on the Time of Flight (ToF) of a signal, the intensity of the signal (e.g. the light intensity), etc. Techniques for determining distances between lighting devices based on signals communicated between the lighting devices are known in the art and will therefore not be discussed in further detail. The predetermined proximity range may for example be a threshold distance, and, if the distance between the first lighting device and the second lighting device does not exceed the threshold distance, the processor 106 may determine that the second lighting device is located within the predetermined proximity range. FIG. 2 shows an example wherein a first distance 202 between a first lighting device 220 of a first lighting system and a second lighting device 240) of a second lighting system is determined. This first distance 202 may be within the threshold distance, and the processor 106 may determine that the second lighting device 240 is located within the predetermined proximity range of the first lighting device 220. The processor 106 may further determine a second distance 204 between a further first lighting device 222 of the first lighting system and the second lighting device 240 of the second lighting system. This second distance may not be within the threshold distance, and the processor 106 may determine that the second lighting device 240 is not located within the predetermined proximity range of the further first lighting device 222. In FIG. 2, the processor 106 may for instance determine that further second lighting device 242 is located within the predetermined proximity range of further first lighting device 222.

The one or more signals may comprise one or more first control signals indicative of control of the first lighting device and one or more second control signals indicative of control of the second lighting device. The processor 106 may be further configured to determine a presence of a temporal correlation between the control of the first lighting device and the control of the second lighting device, and determine that the second lighting device is located within the predetermined proximity range of the first lighting device if the temporal correlation is present. The processor 106 may be configured to monitor the presence of the one or more first control signals indicative of control of the first lighting device and the one or more second control signals indicative of control of the second lighting device over a period of time. Based on this (historical) data gathered over a period of time (e.g. days, weeks, months), the processor 106 may determine a temporal correlation between control of the first lighting device and control of the second lighting device. It may, for instance, occur that a user typically controls the first lighting device and the second lighting device at the same time (e.g. because they are located in the same room, because they are controlled via the same switch or based on the same voice command, because they are powered/unpowered by the same AC wall switch, etc.). Thus, the processor 106 may determine if there is such a temporal correlation to determine that the second lighting device is within the predetermined proximity range of the first lighting device. If no temporal correlation is present (i.e. when control commands are communicated at different moments in time), the processor 106 may determine that the second lighting device is not located within the predetermined proximity range of the first lighting device.

The one or more signals may comprise a first user-defined name of the first lighting device and a second user-defined name of the second lighting device. The processor 106 may be configured to compare the first user-defined name to the second user-defined name, and determine if the second lighting device is located within the predetermined proximity range of the first lighting device if the first user-defined name is similar to the second user-defined name. The processor 106 may, for example, determine that the first user-defined name and the second user-defined name refer to a same area, for instance, "living room". In another example, the processor 106 may, for example, determine that the first lighting device has a name "entertainment lamp left" and the second lighting device may have the same prefix "entertainment lamp top", and that the names are similar due to the "entertainment" prefix. Based on these similarities, the processor 106 may determine that the second lighting device is located in the same area or close to the first device, and thereby within the predetermined proximity range of the first lighting device.

The one or more signals may comprise a first user-defined name descriptive of the area and a second user-defined name of the second lighting device. The processor 106 may be configured to compare the first user-defined name to the second user-defined name, and determine that the second lighting device is located within the predetermined proximity range of the first lighting device if the first user-defined name is similar to the second user-defined name. The area may, for example, have been named "kitchen", and the second lighting device may have been named "kitchen lamp 1". The processor 106 may analyze these names and determine that there is a similarity ("kitchen"), and thereby determine that the second lighting device is located within the predetermined proximity range of the first lighting device.

The first lighting device may comprise a first sensor and the second lighting device may comprise a second sensor. The one or more signals may comprise first sensor data from the first sensor and second sensor data from the second sensor. The processor 106 may be configured to compare the first sensor data to the second sensor data, and determine if the second lighting device is located within the predetermined proximity range of the first lighting device if the first sensor data is similar to the second sensor data. The first and second sensor may, for example, be sensors for sensing environmental parameters. Examples of sensors include but are not limited to audio sensors. (day)light sensors, temperature sensors. presence sensors, etc. In an example, the sensors may be presence sensors (e.g. a PIR sensor, an RF sensor, a camera, etc.) and the processor 106 may compare first sensor data (indicative of presence in the environment of the first lighting device) with second sensor data (indicative of presence in the environment of the second lighting device), and if the presences correspond, the processor 106 may determine that the second lighting device is located within the predetermined proximity range of the first lighting device. The sensors may, for example, be temperature sensors and the processor 106 may compare first sensor data (e.g. a first temperature of the environment of the first lighting device) with second sensor data (e.g. a second temperature of the environment of the second lighting device), and if the temperatures correspond, the processor 106 may determine that the second lighting device is located within the predetermined proximity range of the first lighting device. In another example, the sensors may, for example, be audio sensors (microphones) and the processor 106 may compare first sensor data (audio detected by the first audio sensor) with second sensor data (audio detected by the second audio sensor), and if the audio signals correspond, the processor 106 may determine that the second lighting device is located within the predetermined proximity range of the first lighting device. It should be understood that these are mere examples of sensors, and that the skilled person is able to design alternatives without departing from the scope of the appended claims. The processor 106 may be further configured to determine a presence of a temporal correlation between the first sensor data and the second sensor data, and determine if the second lighting device is located within the predetermined proximity range of the first lighting device if the temporal correlation is present. For instance, when presence is detected at the same moment in time, or when a temperature change is detected at the same moment in time, it may be an indication that the first lighting device and the second lighting device are within each other's proximity. If no temporal correlation is present (i.e. when sensor values change at different moments in time), the processor 106 may determine that the second lighting device is not located within the predetermined proximity range of the first lighting device.

The first lighting device may comprise a light sensor and the one or more signals may comprise a sensor signal from the light sensor indicative of a change of the light level in the space and a control signal indicative of control of the second lighting device. The processor 106 may be configured to determine a presence of a temporal correlation between the control of the second lighting device and the sensor signal, and determine that the second lighting device is located within the predetermined proximity range of the first lighting device if the temporal correlation is present. Additionally or alternatively, the second lighting device may comprise the light sensor and it may detect a change of the light level in the environment when the light output of the first lighting device is changed. In other words, at least one of the lighting devices may comprise a light sensor (e.g. a photodiode, a camera, etc.), and when a change in light in the environment corresponds to a change of the light output of the other lighting device, the processor 106 may determine that the lighting devices are within the predetermined proximity range.

FIG. 3 shows an example wherein a second lighting device 340 of a second lighting system is located within a first predetermined proximity range 302 of a first lighting device 320. Additionally, the second lighting device 340 is also located within a second predetermined proximity range 304 of a further first lighting device 322 of the first lighting system. The processor 106 may thus determine that the second lighting device 340 is located within both predetermined proximity ranges 302, 304 of both first lighting devices 320, 322. If a second lighting device is located within the predetermined proximity range of multiple first lighting devices which are located in different areas 350, 360, the processor 106 may determine a first distance between the first lighting device 320 and the second lighting device 340 based on the one or more signals communicated between these lighting devices (e.g. based on the RSSI, ToF, SnR of one or more signals communicated between the lighting devices), and determine a second distance between the further first lighting device 322 and the second lighting device 340 based on the one or more signals communicated between these lighting devices (e.g. based on the RSSI, ToF, SnR of one or more signals communicated between the lighting devices). The processor 106 may then determine to select a first lighting device based on the distances (i.e. the closest first lighting device, which would be lighting device 320 in FIG. 3), and associate the second lighting device 340 with the area 350) of the selected first lighting device 320.

The processor 106 may be further configured to request a user, via a user interface, to confirm if the second lighting device is located in the area, and executing associating the second lighting device with the area only if the confirmation is positive. The user interface may be comprised in the control system 102, or it may be comprised in a remote device communicatively coupled to the control system 102. The user interface may be a touch display, and the processor 106 may be configured (to instruct a device comprising the touch display) to request the user to confirm that the second lighting device is located in the area. In another example, the user interface may be a voice assistant, and the processor 106 may be configured to instruct the voice assistant to request the user to confirm that the second lighting device is located in the area. If the second lighting device is not located in the area, the processor 106 may for example request the user to indicate via the user interface in which area the second device is located.

Figure 4:
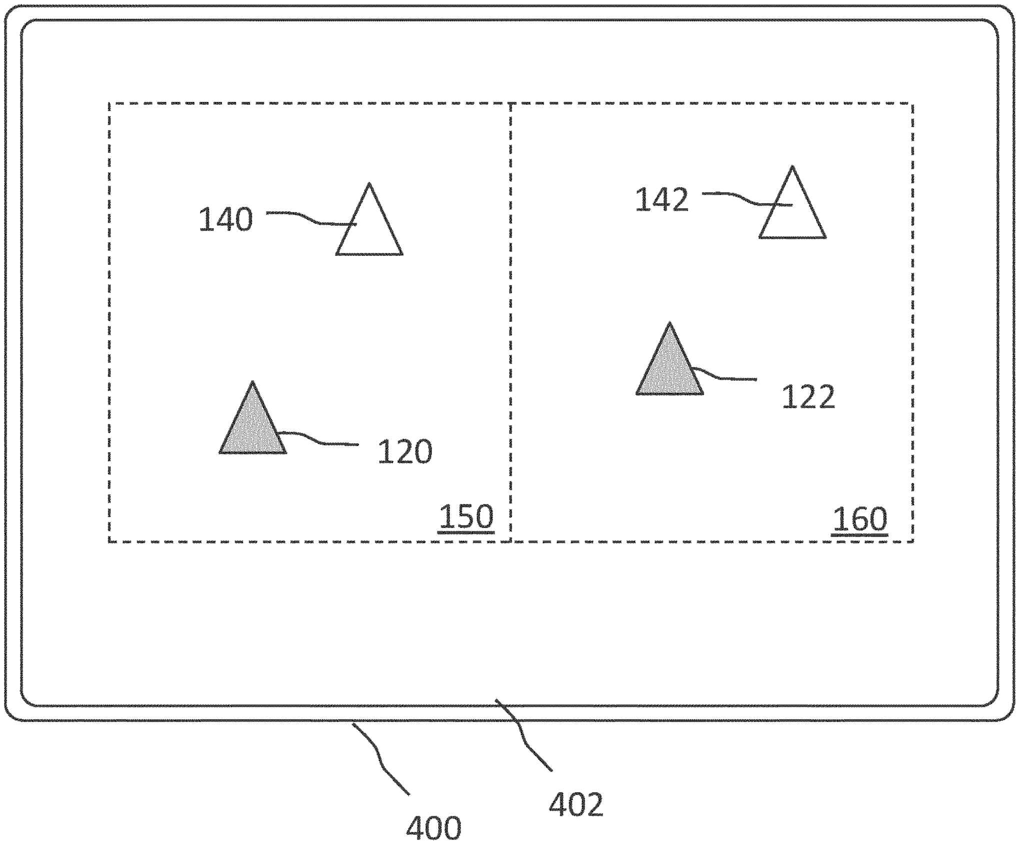
FIG. 4 shows schematically an example of a user interface device comprising a display for rendering virtual representations of a space and lighting devices of different lighting systems.

The processor 106 may be further configured to render, on a display, virtual representations of the area, the first lighting device and the second lighting device. The display may be comprised in the control system 102, or it may be comprised in a remote device communicatively coupled to the control system 102. The virtual representations may be rendered to indicate that the second lighting device has been associated with the area. FIG. 4 shows an example of a device 400 comprising a display 402 which shows the first area 150) and the second area 160, and the lighting devices of the first and second lighting systems. The processor 106 may render the first lighting devices 120, 122 of the first lighting system with a first appearance (dark gray in FIG. 4) and the second lighting devices 140, 142 of the second lighting system with a second appearance (white in FIG. 4) to indicate that the second lighting devices 140, 142 originally belong to the second lighting system. After associating the second lighting devices 140, 142 with the respective areas 150, 160, the processor 106 may change the appearance of the first and/or second lighting devices to indicate that the second lighting devices 140, 142 have been associated with the respective areas 150, 160.

The processor 106 may be further configured to control the second lighting device by changing its light output after the second lighting device has been associated with the area. The processor 106 may send a control command to the second lighting device, for instance via the first and/or second lighting control system 110, 130, depending on whether the second lighting device has already been added to the first lighting control system 110.

Figure 5:
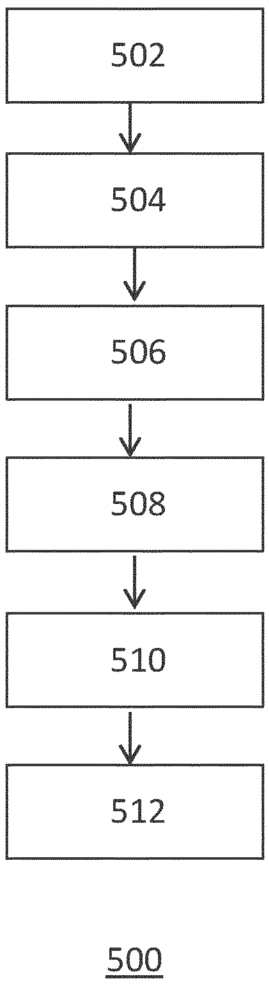
FIG. 5 shows schematically a method of merging a first lighting system with a second lighting system.

FIG. 5 shows schematically a method of merging a first lighting system with a second lighting system, wherein the first lighting system comprises a plurality of first lighting devices located in a space and a first lighting control system for controlling the plurality of first lighting devices, and wherein the second lighting system comprises a plurality of second lighting devices located in the space and a second lighting control system for controlling the plurality of second lighting devices. The method 500 comprises: obtaining 502 one or more signals, which one or more signals are indicative of a location of a second lighting device of the plurality of second lighting devices relative to a first lighting device of the plurality of first lighting devices, determining 504 if the second lighting device is located within a predetermined proximity range of the first lighting device based on the one or more signals, obtaining 506, from the first lighting control system, information indicative of an association between the first lighting device and an area in the space, associating 508, if the second lighting device is located within the predetermined proximity range, the second lighting device with the area associated with the first lighting device, storing 510 the association in a memory of the first lighting control system, and connecting 512 the second lighting device to the first lighting control system.

The method 500 may be executed by computer program code of a computer program product when the computer program product is run on a processing unit of a computing device, such as the control system 102.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer or processing unit. In the device claim enumerating several means, several of these means may be embodied by one and the same item of hardware. The mere fact that certain measures are recited in mutually different dependent claims does not indicate that a combination of these measures cannot be used to advantage.

Aspects of the invention may be implemented in a computer program product, which may be a collection of computer program instructions stored on a computer readable storage device which may be executed by a computer. The instructions of the present invention may be in any interpretable or executable code mechanism, including but not limited to scripts, interpretable programs, dynamic link libraries (DLLs) or Java classes. The instructions can be provided as complete executable programs, partial executable programs, as modifications to existing programs (e.g. updates) or extensions for existing programs (e.g. plugins). Moreover, parts of the processing of the present invention may be distributed over multiple computers or processors or even the 'cloud'.

Storage media suitable for storing computer program instructions include all forms of nonvolatile memory, including but not limited to EPROM, EEPROM and flash memory devices, magnetic disks such as the internal and external hard disk drives, removable disks and CD-ROM disks. The computer program product may be distributed on such a storage medium. or may be offered for download through HTTP, FTP, email or through a server connected to a network such as the Internet.

The invention claimed is:

1. A method of merging a first lighting system with a second lighting system, wherein the first lighting system comprises a plurality of first lighting devices located in a space and a first lighting control system for controlling the plurality of first lighting devices, wherein the second lighting system comprises a plurality of second lighting devices located in the space and a second lighting control system for controlling the plurality of second lighting devices, the method comprising:

obtaining one or more signals, which one or more signals are indicative of a location of a second lighting device of the plurality of second lighting devices relative to a first lighting device of the plurality of first lighting devices, determining when the second lighting device is located within a predetermined proximity range of the first lighting device based on the one or more signals, obtaining, from the first lighting control system, information indicative of an association between the first lighting device and an area in the space, associating, when the second lighting device is located within the predetermined proximity range, the second lighting device with the area associated with the first lighting device, storing the association in a memory of the first lighting control system, connecting the second lighting device to the first lighting control system;

obtaining one or more further signals, which one or more further signals are indicative of a location of a further second lighting device of the plurality of second lighting devices relative to a further first lighting device of the plurality of first lighting devices, determining whether the further second lighting device is located within a predetermined proximity range of the further first lighting device based on the one or more further signals, obtaining, from the first lighting control system, information indicative of an association between the further first lighting device and a further area in the space, associating, when the further second lighting device is located within the predetermined proximity range, the further second lighting device with the further area associated with the further first lighting device, storing the association in the memory of the first lighting control system, and connecting the further second lighting device to the first lighting control system.

2. The method of claim 1, further comprising:

obtaining, from the first lighting control system, one or more lighting control rules associated with the first lighting device, associating the second lighting device with the one or more lighting control rules, and storing the association in the memory.

3. The method of claim 2, wherein the one or more lighting control rules are control rules for controlling lighting devices in the area.

4. The method of claim 1, wherein the one or more signals are signals communicated between the first lighting device and the second lighting device, and wherein the method comprises: determining that the second lighting device is located within the predetermined proximity range based on signal characteristics of the signals communicated between the first lighting device and the second lighting device.

5. The method of claim 1, wherein the one or more signals comprise one or more first control signals indicative of control of the first lighting device and one or more second control signals indicative of control of the second lighting device, and wherein the method comprises:

determining a presence of a temporal correlation between the control of the first lighting device and the control of the second lighting device, and determining that the second lighting device is located within the predetermined proximity range of the first lighting device when the temporal correlation is present.

6. The method of claim 1, wherein the one or more signals comprise a first user-defined name of the first lighting device and a second user-defined name of the second lighting device, and wherein the method comprises:

comparing the first user-defined name to the second user-defined name, and determining that the second lighting device is located within the predetermined proximity range of the first lighting device when the first user-defined name is the same as the second user-defined name.

7. The method of claim 1, wherein the one or more signals comprise a first user-defined name descriptive of the area and a second user-defined name of the second lighting device, and wherein the method comprises:

comparing the first user-defined name to the second user-defined name, and determining that the second lighting device is located within the predetermined proximity range of the first lighting device when the first user-defined name is the same as to the second user-defined name.

8. The method of claim 1, wherein the first lighting device comprises a first sensor and the second lighting device comprises a second sensor, and wherein the one or more signals comprise first sensor data from the first sensor and second sensor data from the second sensor, and wherein the method comprises:

comparing the first sensor data to the second sensor data, and determining that the second lighting device is located within the predetermined proximity range of the first lighting device when the first sensor data is the same as the second sensor data.

9. The method of claim 8, further comprising:

determining a presence of a temporal correlation between the first sensor data and the second sensor data, and determining that the second lighting device is located within the predetermined proximity range of the first lighting device when the temporal correlation is present.

10. The method of claim 1, wherein:

the first lighting device comprises a light sensor and wherein the one or more signals comprise a sensor signal from the light sensor indicative of a change of the light level in the space and a control signal indicative of control of the second lighting device, and wherein the method further comprises:

determining a presence of a temporal correlation between the control of the second lighting device and the sensor signal, and determining that the second lighting device is located within the predetermined proximity range of the first lighting device when the temporal correlation is present; or the second lighting device comprises a light sensor and wherein the one or more signals comprise a sensor signal from the light sensor indicative of a change of the light level in the space and a control signal indicative of control of the first lighting device, and the method further comprises:

determining a presence of a temporal correlation between the control of the first lighting device and the sensor signal, and determining that the second lighting device is located within the predetermined proximity range of the first lighting device if the temporal correlation is present.

11. The method of claim 1, further comprising: requesting a user to confirm whether the second lighting device is located in the area, and executing associating the second lighting device with the area only when the confirmation is positive.

12. The method of claim 1, further comprising controlling the second lighting device by changing its light output after the second lighting device has been associated with the area.

13. A non-transitory computer-readable medium comprising computer program code to perform the method of claim 1 when run on a processor.

14. A control system for merging a first lighting system with a second lighting system, wherein the first lighting system comprises a plurality of first lighting devices located in a space and a first lighting control system for controlling the plurality of first lighting devices, wherein the second lighting system comprises a plurality of second lighting devices located in the space and a second lighting control system for controlling the plurality of second lighting devices, the control system comprising:

an input configured to obtain one or more signals, which one or more signals being indicative of a location of a second lighting device of the plurality of second lighting devices relative to a first lighting device of the plurality of first lighting devices, and configured to obtain one or more further signals, one or more further signals being indicative of a location of a further second lighting device of the plurality of second lighting devices relative to a further first lighting device of the plurality of first lighting devices, and a processor configured to:

determine whether the second lighting device is located within a predetermined proximity range of the first lighting device based on the one or more signals, obtain, from the first lighting control system, information indicative of an association between the first lighting device and an area in the space, associate, when the second lighting device is located within the predetermined proximity range, the second lighting device with the area associated with the first lighting device, store the association in a memory of the first lighting control system, connect the second lighting device to the first lighting control system, determine whether the further second lighting device is located within a predetermined proximity range of the further first lighting device based on the one or more further signals, obtain, from the first lighting control system, information indicative of an association between the further first lighting device and a further area in the space, associate, when the further second lighting device is located within the predetermined proximity range, the further second lighting device with the further area associated with the further first lighting device, store the association in the memory of the first lighting control system, and connect the further second lighting device to the first lighting control system.

* * * * *